US010791523B2

(12) United States Patent
Sundararajan et al.

(10) Patent No.: US 10,791,523 B2
(45) Date of Patent: *Sep. 29, 2020

(54) CONFIGURING DIFFERENT UPLINK POWER CONTROL FOR LONG AND SHORT UPLINK BURSTS

(71) Applicant: QUALCOMM Incorporated, San Diego, CA (US)

(72) Inventors: Jay Kumar Sundararajan, San Diego, CA (US); Hao Xu, Beijing (CN); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,260

(22) Filed: Sep. 19, 2019

(65) Prior Publication Data

US 2020/0053658 A1 Feb. 13, 2020

Related U.S. Application Data

(63) Continuation of application No. 15/879,322, filed on Jan. 24, 2018, now Pat. No. 10,440,657.

(Continued)

(51) Int. Cl.
*H04W 52/14* (2009.01)
*H04W 52/24* (2009.01)
(Continued)

(52) U.S. Cl.
CPC ....... *H04W 52/146* (2013.01); *H04W 52/242* (2013.01); *H04W 52/325* (2013.01); *H04W 52/365* (2013.01); *H04W 88/02* (2013.01)

(58) Field of Classification Search
None
See application file for complete search history.

(56) References Cited

U.S. PATENT DOCUMENTS

| 5,862,451 A * | 1/1999 | Grau | H04H 20/42 |
| | | | 348/192 |
| 6,707,829 B1 * | 3/2004 | Hanks | H04J 3/0682 |
| | | | 348/E7.07 |

(Continued)

FOREIGN PATENT DOCUMENTS

WO 2016040290 A1 3/2016

OTHER PUBLICATIONS

International Search Report and Written Opinion—PCT/US2018/015308—ISA/EPO—Apr. 20, 2018.

(Continued)

*Primary Examiner* — Mohammed Rachedine
(74) *Attorney, Agent, or Firm* — Qualcomm Incorporated (57) ABSTRACT

Aspects of the present disclosure provide techniques for a user equipment (UE) to set uplink power control for a long uplink burst and a short uplink burst. The UE receives uplink power control information including a first set of power control parameters for a long uplink burst and a second set of power control parameters for a short uplink burst with the sets of power control parameters being different from each other. The UE configures uplink power control for the long uplink burst based at least on the first set of power control parameters and the short uplink burst based at least on the second set of power control parameters. The UE sends at least one of a long uplink burst and a short uplink burst based on the corresponding uplink power control and sends at least one uplink power-headroom report for the long uplink burst and short uplink burst.

22 Claims, 6 Drawing Sheets

Related U.S. Application Data (60) Provisional application No. 62/450,761, filed on Jan. 26, 2017.

(51) Int. Cl.
*H04W 52/32* (2009.01)
*H04W 52/36* (2009.01)
*H04W 88/02* (2009.01)

(56) References Cited

U.S. PATENT DOCUMENTS

| | | | |
|---|---|---|---|
| 8,363,605 B2 | 1/2013 | Lundby et al. | |
| 9,456,421 B2 | 9/2016 | Pan et al. | |
| 2004/0004934 A1* | 1/2004 | Zhu | H04L 27/2675 370/208 |
| 2004/0005022 A1* | 1/2004 | Zhu | H04L 27/2675 375/365 |
| 2004/0008614 A1* | 1/2004 | Matsuoka | H04B 7/0848 370/203 |
| 2004/0203981 A1 | 10/2004 | Budka et al. | |
| 2008/0186868 A1 | 8/2008 | Ma et al. | |
| 2013/0114562 A1 | 5/2013 | Seo et al. | |
| 2015/0085716 A1 | 3/2015 | Zhang et al. | |
| 2018/0213485 A1 | 7/2018 | Sundararajan et al. | |

OTHER PUBLICATIONS

LG Electronics: "Discussion on sPUSCH Design with TTI Shortening", 3GPP Draft; R1-164544, 3rd Generation Partnership Project (3GPP), Mobile Competence Centre, 650, Route Des Lucioles, F-06921 Sophia-Antipolis Cedex, France, vol. RAN WG1, No. Nanjing, China; May 23, 2016-May 27, 2016 May 14, 2016, XP051096392, Retrieved from the Internet: URL:http://www.3gpp.org/ftp/tsg_ran/WG1_RL1/TSGR1_85/Docs/ [retrieved on May 14, 2016], 4 pages.

\* cited by examiner

CONFIGURING DIFFERENT UPLINK POWER CONTROL FOR LONG AND SHORT UPLINK BURSTS

CROSS-REFERENCE TO RELATED APPLICATION(S)

This application is a Continuation Application of U.S. patent application Ser. No. 15/879,322, entitled "CONFIGURING DIFFERENT UPLINK POWER CONTROL FOR LONG AND SHORT UPLINK BURSTS," filed on Jan. 24, 2018 and issued as U.S. Pat. No. 10,440,657, which claims the benefit of U.S. Provisional Application Ser. No. 62/450,761, entitled "CONFIGURING DIFFERENT UPLINK POWER CONTROL FOR REGULAR AND COMMON UPLINK BURSTS" and filed on Jan. 26, 2017, which are expressly incorporated by reference herein in their entireties.

BACKGROUND

Aspects of the present disclosure relate generally to wireless communication networks, and more particularly, to uplink power control at a user equipment (UE).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current uplink power control procedures may not provide a desired level of granularity for configuring uplink power control and/or interference management for efficient operations. Thus, improvements in wireless communication network operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method for sending a long uplink burst and a short uplink burst from a user equipment (UE) to a base station is described. The described aspects include receiving at the UE, uplink power control information from a base station. The uplink power control information includes a first set of power control parameters for a long uplink burst and a second set of power control parameters for a short uplink burst, with the first set of power control parameters being different from the second set of power control parameters. The described aspects further include configuring, by the UE, uplink power control for the long uplink burst based at least on the first set of power control parameters and the short uplink burst based at least on the second set of power control parameters. The described aspects further include sending, by the UE, at least one of a long uplink burst and a short uplink burst based on the uplink power control and sending, by the UE, at least one uplink power-headroom report for the long uplink burst and short uplink burst.

In an aspect, a user equipment (UE) for sending a long uplink burst and a short uplink burst is described. The UE may include a memory configured to store instructions and a processor communicatively coupled with the memory, the processor configured to execute the instructions to receive, at the UE, uplink power control information from a base station is described. The uplink power control information includes a first set of power control parameters for a long uplink burst and a second set of power control parameters for a short uplink burst, with the first set of power control parameters being different from the second set of power control parameters. The described aspects further include configuring, by the UE, uplink power control for the long uplink burst based at least on the first set of power control parameters and the short uplink burst based at least on the second set of power control parameters. The described aspects further include sending, by the UE, at least one of a long uplink burst and a short uplink burst based on the corresponding uplink power control and sending, by the UE, at least one uplink power-headroom report for the long uplink burst and short uplink burst.

In an aspect, a computer-readable medium may store computer executable code for sending a long uplink burst and a short uplink burst from a user equipment (UE) to a base station is described. The described aspects include code for receiving, at the UE, uplink power control information from a base station. The uplink power control information includes a first set of power control parameters for a long uplink burst and a second set of power control parameters for a short uplink burst, with the first set of power control parameters being different from the second set of power control parameters. The described aspects include code for configuring, by the UE, uplink power control for the long uplink burst based at least on the first set of power control parameters and the short uplink burst based at least on the second set of power control parameters. The described aspects include code for sending, by the UE, at least one of a long uplink burst and a short uplink burst based on the corresponding uplink power control and sending, by the UE, at least one uplink power-headroom report for the long uplink burst and short uplink burst.

In an aspect, a user equipment (UE) for sending a long uplink burst and a short uplink burst to a base station is described. The described aspects include means for receiving, at the UE, uplink power control information from a base station. The uplink power control information includes a first set of power control parameters for a long uplink burst and a second set of power control parameters for a short uplink burst, with the first set of power control parameters being different from the second set of power control parameters. The described aspects include means for configuring, by the UE, uplink power control for the long uplink burst based at least on the first set of power control parameters and the short uplink burst based at least on the second set of power control parameters. The described aspects include means for sending, by the UE, at least one of a long uplink burst and a short uplink burst based on the corresponding uplink power control and means for sending, by the UE, at least one uplink power-headroom report for the long uplink burst and short uplink burst.

In an aspect, a method for sending uplink power control information from a base station to a user equipment is described. The described aspects include determining for a user equipment (UE), by the base station, uplink power control information including a first set of power control parameters for a long uplink burst and a second set of power control parameters for a short uplink burst, with the first set of power control parameters being different from the second set of power control parameters. The described aspects further include sending, by the base station, the uplink power control for the long uplink burst and the short uplink burst to the UE. The described aspects further include receiving, by the base station, at least one of a long uplink burst and a short uplink burst based on the uplink power control and receiving, by the base station, at least one uplink power-headroom report for the long uplink burst and short uplink burst. The described aspects further include determining, by the base station, one or more power commands for the long uplink burst, short uplink burst or both, in response to receiving the at least power headroom report. The described aspects further include sending, by the base station, the one or more power commands to the UE.

In an aspect, a base station for sending uplink power control information from the base station to a user equipment (UE) is described. The base station may include a memory configured to store instructions and a processor communicatively coupled with the memory, the processor configured to execute the instructions to determine for a UE, by the base station, uplink power control information including a first set of power control parameters for a long uplink burst and a second set of power control parameters for a short uplink burst, with the first set of power control parameters being different from the second set of power control parameters. The described aspects further include sending, by the base station, the uplink power control for the long uplink burst and the short uplink burst to the UE. The described aspects further include receiving, by the base station, at least one of a long uplink burst and a short uplink burst based on the uplink power control and receiving, by the base station, at least one uplink power-headroom report for the long uplink burst and short uplink burst. The described aspects further include determining, by the base station, one or more power commands for the long uplink burst, short uplink burst or both, in response to receiving the at least power headroom report. The described aspects further include sending, by the base station, the one or more power commands to the UE.

In an aspect, a computer-readable medium may store computer executable code for a base station to send uplink power control information from the base station to a user equipment (UE) is described. The described aspects include code for determining for a UE, by the base station, uplink power control information including a first set of power control parameters for a long uplink burst and a second set of power control parameters for a short uplink burst, with the first set of power control parameters being different from the second set of power control parameters. The described aspects further include code for sending, by the base station, the uplink power control for the long uplink burst and the short uplink burst to the UE. The described aspects further include receiving, by the base station, at least one of a long uplink burst and a short uplink burst based on the uplink power control and receiving, by the base station, at least one uplink power-headroom report for the long uplink burst and short uplink burst. The described aspects further include code for determining, by the base station, one or more power commands for the long uplink burst, short uplink burst or both, in response to receiving the at least power headroom report. The described aspects further include code for sending, by the base station, the one or more power commands to the UE.

In aspect, a base station for sending uplink power control information from the base station to a user equipment (UE) is described. The base station may include means for determining for a UE, by the base station, uplink power control information including a first set of power control parameters for a long uplink burst and a second set of power control parameters for a short uplink burst, with the first set of power control parameters being different from the second set of power control parameters. The described aspects further include means for sending, by the base station, the uplink power control for the long uplink burst and the short uplink burst to the UE. The described aspects further include means for receiving, by the base station, at least one of a long uplink burst and a short uplink burst based on the uplink power control and receiving, by the base station, at least one uplink power-headroom report for the long uplink burst and short uplink burst. The described aspects further include means for determining, by the base station, one or more power commands for the long uplink burst, short uplink burst or both, in response to receiving the at least power headroom report. The described aspects further include means for sending, by the base station, the one or more power commands to the UE.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present disclosure generally relates to configuring uplink power control at a user equipment (UE). For example, the configuration of uplink power control may include configuring different (e.g., separate) uplink power control set points for long and short uplink bursts. A long or regular uplink burst is generally for longer durations and/or used for transmitting data, e.g., control and/or user data from the UE to the base station. A short or common uplink burst is generally for shorter durations and/or used for transmitting smaller amounts of time sensitive data, e.g., ACK/NACKs, etc., from the UE to the base station. Although the term uplink power control is used, the power control mechanism described herein applies to a long uplink burst in a uplink centric slot and/or a short uplink burst in uplink and downlink centric slots. In an implementation, the UE configures separate power control set points for long and short uplink bursts based on uplink power control information received from a base station. The uplink power control information may include, for instance, parameters which indicate corresponding power spectral densities, e.g., power level per unit of frequency, used by a UE to configure the different power control set points. Additionally, the UE may send separate power headroom reports which indicate available transmission power at the UE corresponding to long and short uplink bursts. The base station may use the available transmission power at the UE indicated in the power headroom reports to configure uplink power control information.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, may describe an LTE/LTE-A system for purposes of example, and LTE terminology is used in much of the description below, although the techniques are applicable beyond LTE/LTE-A applications, such as to 5G NR networks or other next generation communication systems.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
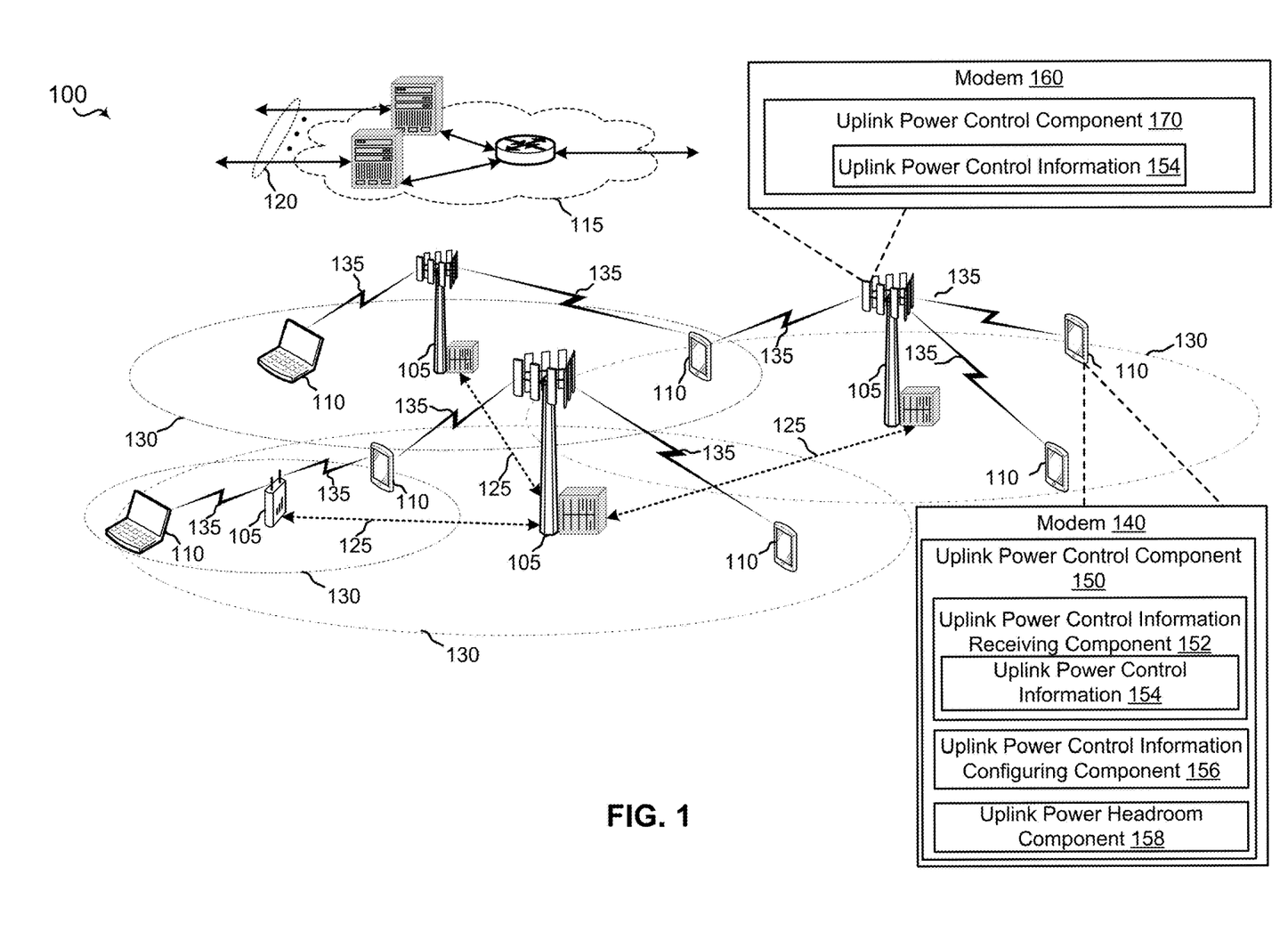
FIG. 1 is a schematic diagram of a wireless communication network including at least one user equipment (UE) having a uplink power control component and at least one base station having a corresponding uplink power control component, both uplink power control components are configured according to this disclosure to manage uplink power control at the UE.

Referring to FIG. 1, in accordance with various aspects of the present disclosure, an example wireless communication network 100 includes at least one UE 110 with a modem 140 having a uplink power control component 150 that manages execution of an uplink power control information receiving component 152, an uplink power control information configuring component 156, and/or an uplink power headroom component 156 for separately configuring and/or managing or controlling uplink power of long and short uplink bursts transmitted by UE 110. The example wireless communication network 100 may further include a base station 105 with a modem 160 and/or a corresponding uplink power control component 170 for transmitting uplink power control information 154 to one or more UEs 110 for separately controlling uplink power of long and short uplink bursts transmitted by the one or more UEs 110.

In one implementation, UE 110 and/or uplink power control component 150 may be configured to receive uplink power control information 154 from base station 105. Uplink power control information 154 may include a first set of power control parameters for a long uplink burst and a second set of power control parameters for a short uplink burst. Each set of power control parameters may comprise a received target power parameter and a path loss compensation factor parameter. The received target power parameter is the target power that UE 110 expects to be received at base station 105. The path loss compensation factor parameter can indicate how much the uplink power needs to be increased to compensate for path loss. The first set of power control parameters may be used to determine a first power control set point for a long uplink burst. The second set of power control parameters may be used to determine a second power control set point for a short uplink burst. The first power control set point may be different from the second power control set point. In other words, due to different interference conditions experienced during the long and short uplink bursts, uplink power control information 154 may have different power control set points for long and short uplink bursts. For example, the received target power parameter of the first set of power control parameters and the received target power parameter of the second set of power control parameters may be the same or may differ. In another example, the first set of power control parameters may be independent of the second set of power control parameters. UE 110 and/or uplink power control component 150, upon receiving uplink power control information, may configure a long uplink burst with the first power control set point and the short uplink burst with the second power control set point.

In an aspect, the first set of power control parameters and the second set of power control parameters can include values and offsets. For example, one of the first set of power control parameters and the second set of power control parameters can include values and the other of the first set of power control parameters and the second set of power control parameters can include offsets from the corresponding values. For example, the first set of power control parameters can include a first received target power value and a path loss compensation factor and the second set of power control parameters can include an offset from the first received target power value and an offset from the first path loss compensation factor.

In an aspect, a power control set point may be defined as a targeted received power at a base station from a UE. For example, base station 105 may indicate to UE 110 a certain power level to be received at a receiver of base station 105 for each unit of frequency (also referred to as power spectral density). The power spectral density, for example, may be a parameter that base station 105 sends to UE 110, in uplink power control information 154. In one implementation, base station 105 may include two sets of values for power spectral density parameter, a first set for long uplink burst and a second set for short uplink burst. UE 110 uses the value of the power spectral density parameter to determine a transmit power of the UE 110 taking into consideration a maximum power limit allowed at UE 110. Further, the power spectral density parameter is changed in a semi-static manner. That is, the power spectral density parameter is changed is generally kept the same for a relatively long time and/or not frequently changed. Additionally, in multi-carrier configurations at UE 110, each carrier may have its own power control set points for long and short uplink bursts. This provides for better uplink power control/management at UE 110.

The power control set points apply to long uplink burst of a uplink centric slot and/or short uplink burst of downlink and uplink centric slots and/or may be controlled using open loop or closed loop power control mechanisms. For example, the open loop power control mechanism, which may be a semi-static approach, may maintain the power spectral density at a certain level (e.g., a target level). The closed loop power control mechanism, which may be a dynamic approach, adjusts the power spectral density over the target. In an aspect, a power command may be used to adjust (e.g., increase or decrease) the uplink transmission power (e.g., the set point) for the long uplink burst and/or short uplink burst. For example, the power command may be one (1) bit in which a value of one (1) would indicate to increase the uplink transmission power (e.g., the set point) by 1 dB and a value of zero (0) would indicate to decrease the uplink transmission power (e.g., set point) by 1 dB. The power command may be for the long uplink burst, the short uplink burst, or both.

In an additional implementation, UE 110 and/or uplink power control component 150 may compute uplink power headroom for long and short uplink bursts, and report the power headroom to base station 105. A power headroom at a UE indicates how much transmission power is left for the UE to use in addition to the power being used by a current transmission. UE 110 may report power headroom for long and short uplink bursts separately and/or at different times so that base station 105 may use the separate power headroom information received from UE 110 for configuring power control set points, separately, in power control information 154. For example, UE 110 may report power headroom for long and short uplink bursts in a single power headroom report or in two separate power headroom reports with one power headroom report for the long uplink burst and another power headroom report for the short uplink burst. Base station 105 may use the one or more power headroom reports received for long and short uplink bursts for configuring/revising uplink power control information 154 sent to UE 110, e.g., via one or more power commands. In one implementation, power headroom reports for short uplink bursts sent from UE 110 may be referred to as companion reports. In a further additional implementation, base station 105 may transmit uplink power control information 154 in a media access control (MAC) message to UE 110.

The one or more power headroom reports may be sent on a periodic basis and/or may be sent in response to a trigger. For example, the one or more power headroom reports may be sent based on a periodic timer. In addition, or alternatively, the one or more power headroom reports may be sent in response to a trigger. For example, UE 110 may calculate the path loss based on reference signal (RS) power notified by base station 105 and the measured RS power at an antenna port of UE 110, and if this value changes over a certain threshold, UE 110 may be triggered to send the one or more power headroom reports.

Thus, according to the present disclosure, uplink power control component 150 may configure uplink power control information 154 at UE 110 for improved interference management.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
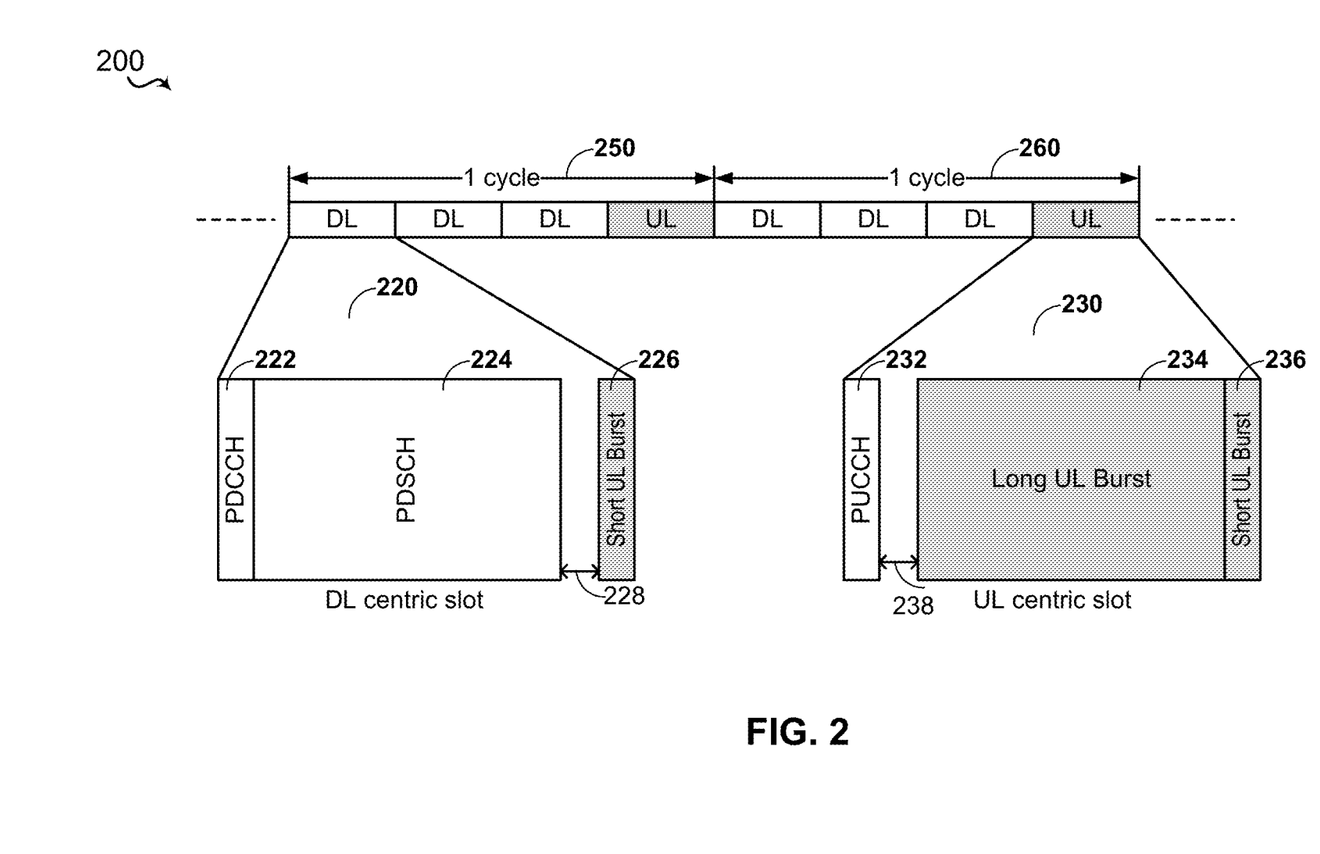
FIG. 2 illustrates an example slot (or frame) structure including a downlink centric slot and/or an uplink centric slot.

Referring to FIG. 2, an example slot (or frame) structure 200 includes a downlink centric slot 220 and/or a uplink centric slot 230. In a non-limiting example, each of cycles 250 and 260 includes three downlink centric slots and one uplink centric slot. Although each cycle in FIG. 2 is shown with four slots, a cycle may be configured with any number of slots and/or any type of slots, e.g., any combination of downlink and/or uplink slots.

As illustrated in FIG. 2, a downlink centric slot 220 may include a physical downlink control channel (PDCCH) 222, a physical downlink shared channel (PDSCH) 224, and/or a short uplink burst 226. A uplink centric slot 230 may include a PDCCH 232, a long uplink burst 234, and/or a short uplink burst 236. The short uplink bursts, 226 and 236 are, in general, of fixed length. In some implementations, a guard interval 228 may separate PDSCH 224 and short uplink burst 226 and/or a guard interval 238 may separate PDSCH 232 and a long uplink burst 234 to minimize or avoid interference, e.g., eNB to eNB interference.

Long uplink bursts 234 (also referred to as regular uplink bursts or long format uplink bursts) are generally configured in a cell-specific manner. That is, a cell may be configured for uplink transmissions, e.g., a long uplink burst and another cell, e.g., a neighbor cell, may be configured for downlink transmissions, e.g., PDSCH 224, at the same time. In contrast, short uplink bursts 236 and 226 (also referred to as common uplink bursts short formatted uplink bursts) are generally configured in a manner such that all cells (e.g., in the vicinity) follow the same uplink direction. In other words, a cell and neighbors of the cell may be configured for short uplink bursts at the same time. The transmissions, with different burst durations, timings, and/or directions may lead to different interference conditions for long and short uplink bursts.

For example, interference observed at a uplink receiver of base station 105 may different for a long uplink burst and a short uplink burst as a long uplink burst generally encounters higher and/or more variable interference than a short uplink burst, for example, based on the transmission directions as described above. Further, a neighbor cell with a downlink transmission is going to cause higher interference than a neighbor cell with a uplink reception (for example, downlink transmissions from a base station are at a higher power level compared to uplink transmissions from a UE). Furthermore, there are other differences between long uplink and short uplink bursts that may lead to different interference levels. Some examples of such differences may include, but are not limited to, channels configured for transmission, types of transmitted data, reliability requirements, payload amounts, signal-to-interference-plus-noise ratios (SINR), waveform types (OFDM/SC-FDM), numerologies (e.g., sub-carrier spacing and symbol duration, multiplexing mechanisms for services for long and short uplink bursts (regular services, low latency services, machine-type communications (MTC), etc.

Figure 3:
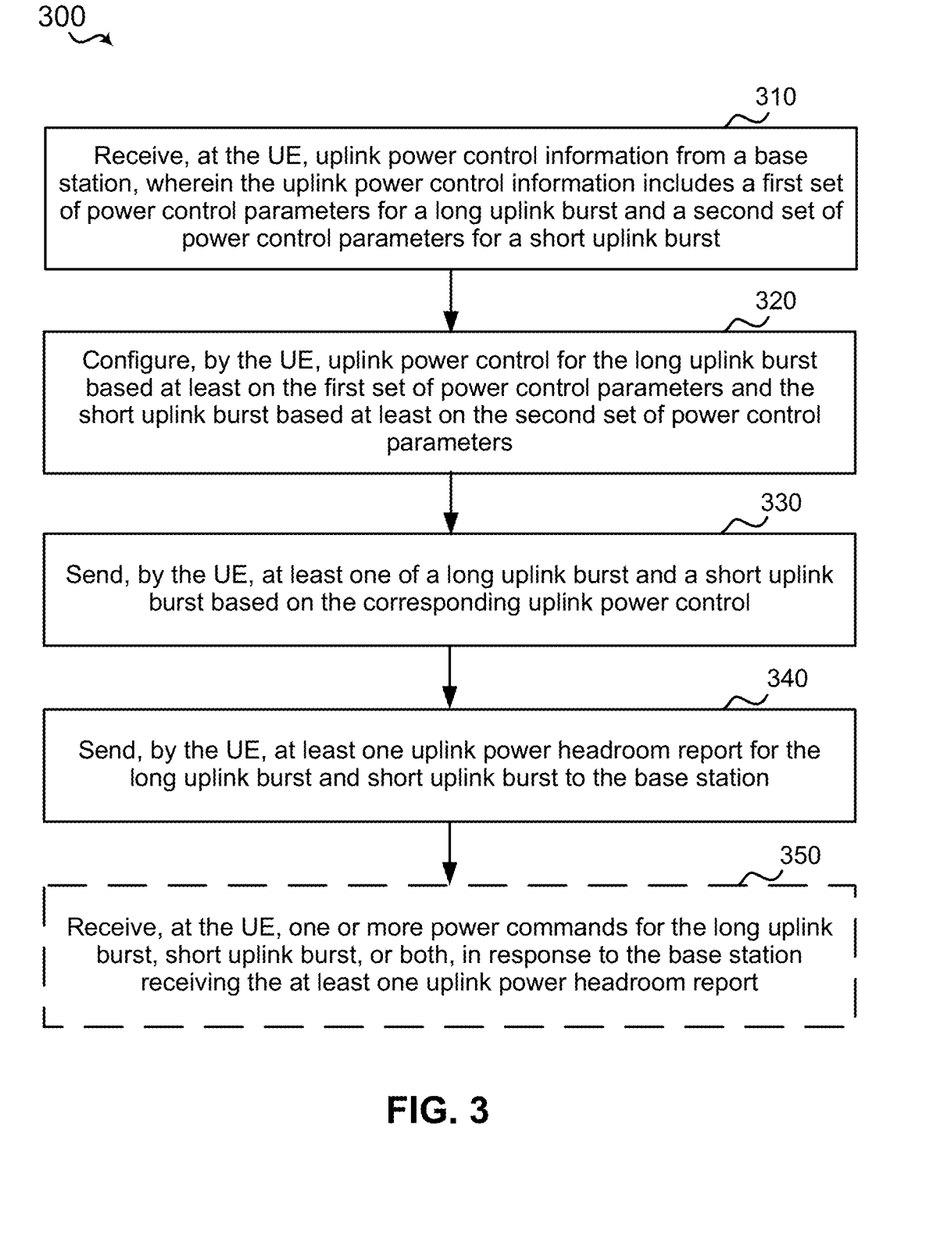
FIG. 3 is a flow diagram of an example method of configuring uplink power control at a UE, according to an aspect of the present disclosure.

Referring to FIG. 3, for example, a method 300 of wireless communication in operating UE 110 according to the above-described aspects to separately configure uplink power control for long uplink bursts and short uplink bursts at UE 110 is disclosed.

For example, at 310, method 300 includes receiving, at the UE, uplink power control information from a base station, wherein the uplink power control information includes a first set of power control parameters for a long uplink burst and a second set of power control parameters for a short uplink burst, wherein the first set of power control parameters are different from the second set of power control parameters. For instance, in an aspect, UE 110 may execute uplink power control component 150 and/or uplink power control information receiving information component 152 to receive uplink power control information 154 via a transceiver (e.g., transceiver 502 and/or receiver 506, FIG. 5) from base station 105, as described herein. As described above in reference to FIG. 1, uplink power control information 154 may include separate sets of power control parameters for long and short uplink bursts for efficiently controlling/managing uplink power control at UE 110. In an alternative or additional aspect, the first set of power control parameters may be different from the second set of power control parameters.

Additionally, at 320, method 300 includes configuring, by the UE, uplink power control for the long uplink burst based at least on the first set of power control parameters and the short uplink burst based at least on the second set of power control parameters. For instance, in an aspect, UE 110 may execute uplink power control component 150 and/or uplink power control information configuring component 156 to configure or set the value of separate power control set points for long and short uplink bursts, as described herein.

Additionally, at 330, method 300 includes sending, by the UE, at least one of a long uplink burst and a short uplink burst based on the corresponding uplink power control. For instance, in an aspect, UE 110 may execute uplink power control component 150 and/or uplink power control information configuring component 156 to send at least one of a long uplink burst and a short uplink burst via a transceiver (e.g., transceiver 502 and/or transmitter 508, FIG. 4) to base station 105, as described herein.

Additionally, at 340, method 300 includes sending, by the UE, at least one uplink power headroom report for the long uplink burst and the short uplink burst to the base station. For instance, in an aspect, UE 110 may optionally execute uplink power control component 150 and/or uplink power headroom component 158 to transmit at least one uplink power headroom report via a transceiver (e.g., transceiver 402 or transmitter 508, FIG. 5) to base station 105, as described herein.

Optionally, at 350, method 300 includes receiving, at the UE, one or more power commands for the long uplink burst, short uplink burst or both in response to base station 105 receiving the at least one uplink power headroom report. For instance, in an aspect, UE 110 may execute uplink power control component 150 and/or uplink power control information receiving information component 152 to receive one or more power commands via a transceiver (e.g., transceiver 502 and/or receiver 506, FIG. 5) from base station 105, as described herein. As described above in reference to FIG. 1, UE 110 may execute uplink power control component 150 and/or uplink power control information configuring component 156 to adjust the value of one or both of the power control set points for the respective long and short uplink bursts in response to receiving the one or more power commands, as described herein. Method 300 may continue at 330.

Figure 4:
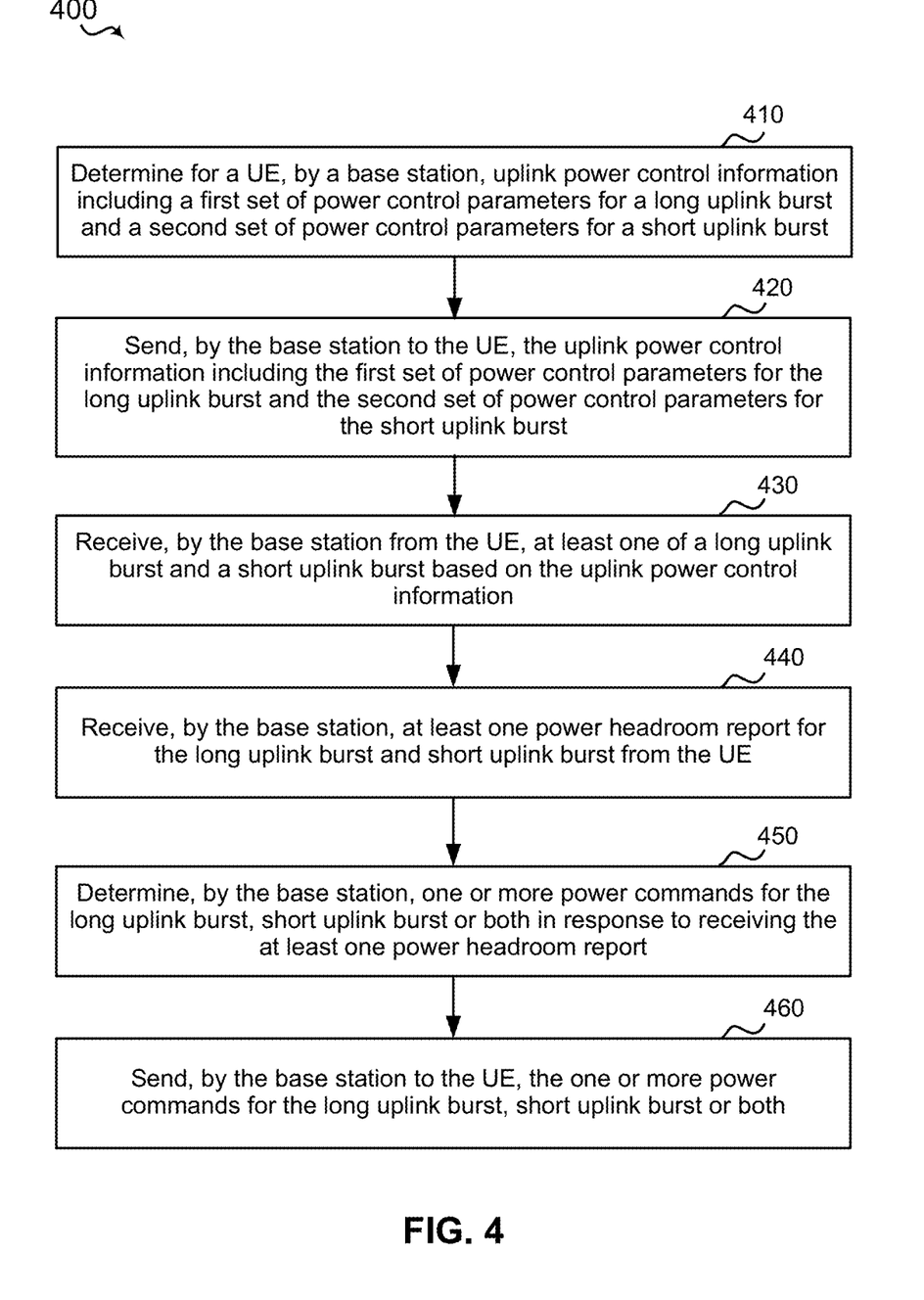
FIG. 4 is a flow diagram of an example method of configuring uplink power control at a base station, according to an aspect of the present disclosure.

Referring to FIG. 4, for example, a method 400 of wireless communication in operating UE 110 according to the above-described aspects to separately configure uplink power control for long uplink bursts and short uplink bursts at base station 105 is disclosed.

For example, at 410, method 400 includes determining for a UE, by a base station, uplink control information including a first set of power control parameters for a long uplink burst and a second set of power control parameters for a short uplink burst, where the first set of control parameters are different from the second set of control parameters. For instance, in an aspect, base station 105 may execute uplink power control component 150 to determine for UE 110, a first set of power control parameters for a long uplink burst and a second set of power control parameters for a short uplink burst. Base station 105 may determine the sets of power control parameters for UE 110 based on information obtained from establishing a connection with UE 110 or from one or more headroom reports received from UE 110.

Additionally at 420, method 400 includes sending, by the base station to the UE, the uplink power control information including the first set of power control parameters for the long uplink burst and the second set of power control parameters for the short uplink burst. For instance, in an aspect, base station 105 may execute uplink power control component 170 to send uplink power control information 154 via a transceiver (e.g., transceiver 602 and/or transmitter 608, FIG. 6) to UE 110, as described herein. As described above in reference to FIG. 1, uplink power control information 154 may include separate sets of power control parameters for the long and short uplink bursts for efficiently controlling/managing uplink power control at UE 110. In an additional aspect, the first set of power control parameters may be different from the second set of power control parameters.

Additionally, at 430, method 400 includes receiving, by the base station from the UE, at least one of a long uplink burst and a short uplink burst based on the uplink power control information. For instance, in an aspect, base station 105 may execute uplink power control component 170 to receive at least one of a long uplink burst and a short uplink burst based on the uplink power control information 154 via a transceiver (e.g., transceiver 602 and/or receiver 606, FIG. 6) from UE 110, as described herein.

Additionally, at 440, method 400 includes receiving, by the base station, at least one uplink power headroom report for the long uplink burst and short uplink burst from the UE. For instance, in an aspect, base station 105 may execute uplink power control component 170 to receive at least one uplink power headroom report via a transceiver (e.g., transceiver 602 or receiver 606, FIG. 6) from UE 110, as described herein.

Additionally, at 450, method 400 includes determining, by the base station, one or more power commands for the long uplink burst, short uplink burst or both in response to receiving the at least one power headroom report. For instance, in an aspect, base station 105 may execute uplink power control component 170 to determine one or more power commands for the long uplink burst, short uplink burst or both in response to receiving the at least one power headroom report, as described herein.

Additionally, at 460, method 400 includes sending, by the base station to the UE, the one or more power commands for the long uplink burst, short uplink burst or both. For instance, in an aspect, base station 105 may execute uplink power control component 170 to send the one or more power commands for the long uplink burst, short uplink burst or both to the UE 110, as described herein.

Figure 5:
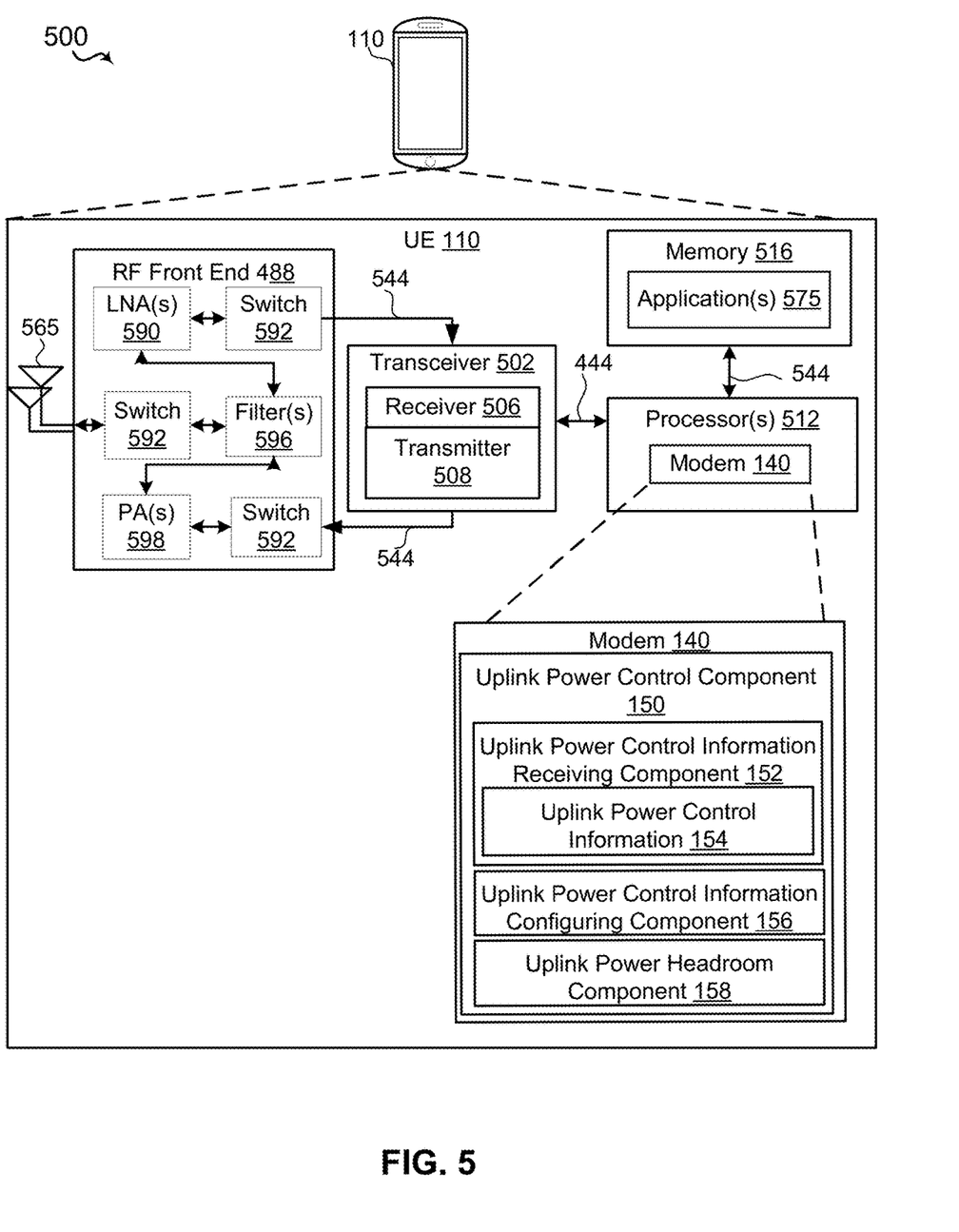
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and uplink power control component 150 to configure uplink power control at UE 110. Further, the one or more processors 512, modem 514, memory 516, transceiver 502, RF front end 588 and one or more antennas 465, may be configured to support voice and/or data calls (simultaneously or non-simultaneously) in one or more radio access technologies.

In an aspect, the one or more processors 512 can include a modem 514 that uses one or more modem processors. The various functions related to uplink power control component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with uplink power control component 150 may be performed by transceiver 502.

Also, memory 516 may be configured to store data used herein and/or local versions of applications 575 or uplink power control component 150 and/or one or more of its subcomponents being executed by at least one processor 512. Memory 516 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining uplink power control component 150 and/or one or more of its subcomponents, and/or data associated therewith, when UE 110 is operating at least one processor 512 to execute uplink power control component 150 and/or one or more of its subcomponents.

Transceiver 502 may include at least one receiver 506 and at least one transmitter 408. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
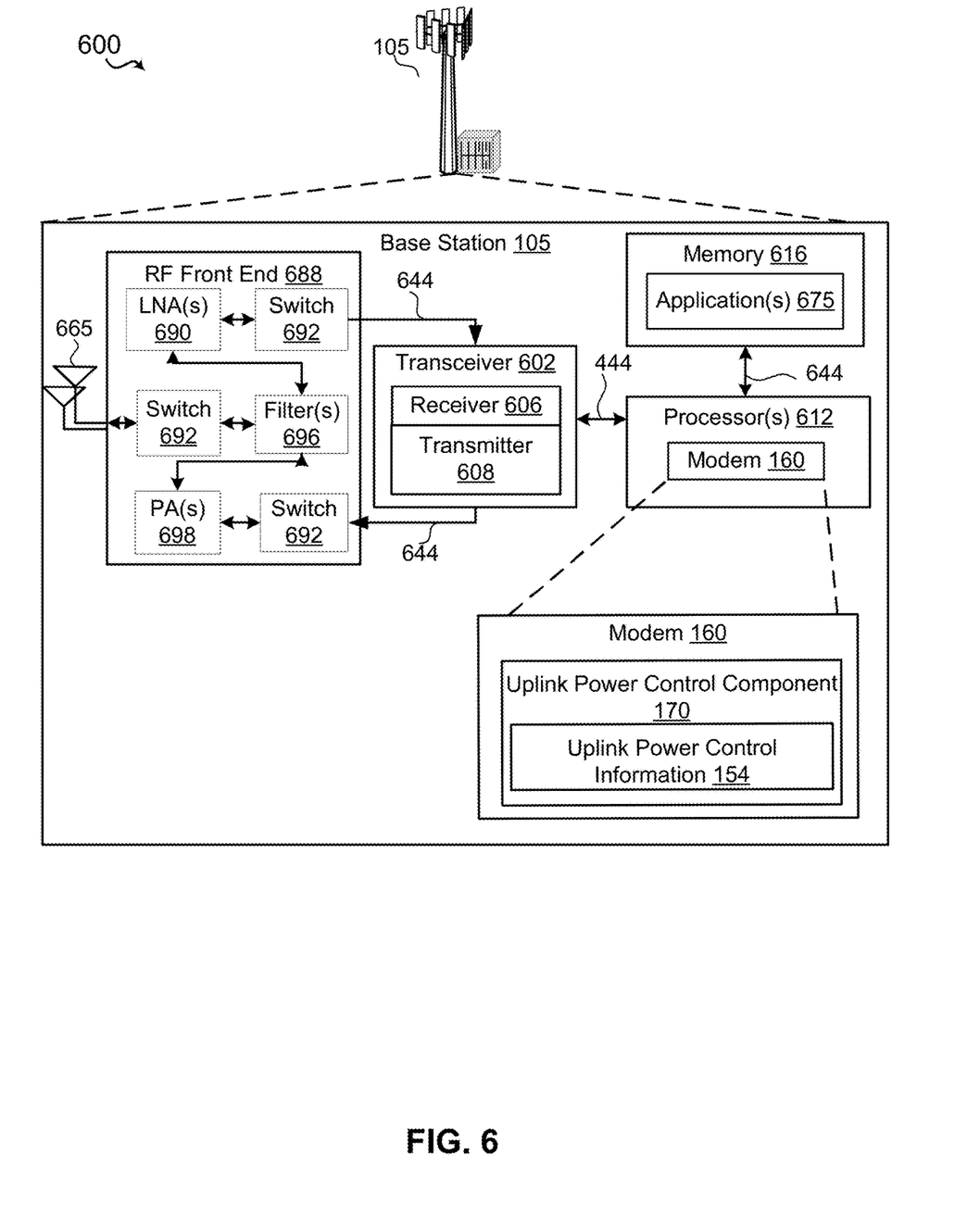
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and the uplink power control component 170.

The transceiver 602, receiver 606, transmitter 608, one or more processors 612, memory 616, applications 675, buses 644, RF front end 688, LNAs 690, switches 692, filters 696, PAs 698, and one or more antennas 666 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of configuring uplink power control at a user equipment (UE), comprising:
   receiving, at the UE, uplink power control information from a base station, wherein the uplink power control information includes one or more first power control parameters for a long uplink burst and one or more second power control parameters for a short uplink burst, and wherein the one or more first power control parameters are different from the one or more second power control parameters and the long uplink burst has a longer duration than the short uplink burst;
   configuring, by the UE, uplink power control for the long uplink burst based at least on the one or more first power control parameters and the short uplink burst based at least on the one or more second power control parameters; and
   sending, by the UE, at least one of a long uplink burst or a short uplink burst based on the corresponding uplink power control.

2. The method of claim 1, wherein the one or more first power control parameters comprises a first value or offset and the one or more second power control parameters comprises a second value or offset.

3. The method of claim 1, further comprising:
   configuring one or more open loop power control parameters for the long uplink burst and the short uplink burst.

4. The method of claim 1, further comprising:
   configuring one or more closed loop power control parameters for the long uplink burst and the short uplink burst.

5. The method of claim 1, further comprising configuring a physical uplink control channel (PUCCH) or a physical uplink shared channel (PUSCH) based on the uplink power control information for the long uplink burst and the short uplink burst.

6. The method of claim 1, further comprising:
   receiving, at the UE, one or more power commands for at least one of the long uplink burst or the short uplink burst; and
   adjusting, by the UE, at least one of a value of a set point for the uplink power control for the long uplink burst or a value of a set point for the uplink power control for the short uplink burst, in response to receiving the one or more power commands.

7. The method of claim 1, wherein sending the at least one of the long uplink burst and the short uplink burst further comprises transmitting the long uplink burst based on a regular service and the short uplink burst based on a low latency service.

8. A user equipment (UE) for wireless communications, comprising:
   a memory;
   a processor coupled with the memory, the memory and the processor configured to:
      receive, at the UE, uplink power control information from a base station, wherein the uplink power control information includes one or more first power control parameters for a long uplink burst and one or more second power control parameters for a short uplink burst, and wherein the one or more first power control parameters are different from the one or more second power control parameters and the long uplink burst has a longer duration than the short uplink burst;
      configure, by the UE, uplink power control for the long uplink burst based at least on the one or more first power control parameters and the short uplink burst based at least on the one or more second power control parameters; and
      send, by the UE, at least one of a long uplink burst and a short uplink burst based on the corresponding uplink power control.

9. The UE of claim 8, wherein the one or more first power control parameters comprises a first value or offset and the one or more second power control parameters comprises a second value or offset.

10. The UE of claim 8, wherein the memory and the processor are further configured to:
   configure one or more open loop power control parameters for the long uplink burst and the short uplink burst.

11. The UE of claim 8, wherein the memory and the processor are further configured to:
   configure one or more closed loop power control parameters for the long uplink burst and the short uplink burst.

12. The UE of claim 8, wherein the memory and the processor are further configured to configure a physical uplink control channel (PUCCH) or a physical uplink shared channel (PUSCH) based on the uplink power control information for the long uplink burst and the short uplink burst.

13. The UE of claim 8, wherein the memory and the processor are further configured to:
   receive, at the UE, one or more power commands for at least one of the long uplink burst or the short uplink burst; and
   adjust, by the UE, at least one of a value of a set point for the uplink power control for the long uplink burst or a value of a set point for the uplink power control for the short uplink burst, in response to receiving the one or more power commands.

14. The UE of claim 8, wherein sending the at least one of the long uplink burst and the short uplink burst further comprises transmitting the long uplink burst based on a regular service and the short uplink burst based on a low latency service.

15. A non-transitory computer readable medium for wireless communications implemented by a user equipment (UE), comprising code for:
   receiving, at the UE, uplink power control information from a base station, wherein the uplink power control information includes one or more first power control parameters for a long uplink burst and one or more second power control parameters for a short uplink burst, and wherein the one or more first power control parameters are different from the one or more second power control parameters and the long uplink burst has a longer duration than the short uplink burst;
   configuring, by the UE, uplink power control for the long uplink burst based at least on the one or more first power control parameters and the short uplink burst based at least on the one or more second power control parameters; and
   sending, by the UE, at least one of a long uplink burst and a short uplink burst based on the corresponding uplink power control.

16. The non-transitory computer readable medium of claim 15, wherein the one or more first power control parameters comprises a first value or offset and the one or more second power control parameters comprises a second value or offset.

17. The non-transitory computer readable medium of claim 15, further comprising code for:
   configuring one or more open loop power control parameters for the long uplink burst and the short uplink burst.

18. The non-transitory computer readable medium of claim 15, further comprising code for:
   configuring one or more closed loop power control parameters for the long uplink burst and the short uplink burst.

19. The non-transitory computer readable medium of claim 15, further comprising code for configuring a physical uplink control channel (PUCCH) or a physical uplink shared channel (PUSCH) based on the uplink power control information for the long uplink burst and the short uplink burst.

20. The non-transitory computer readable medium of claim 15, further comprising code for:
   receiving, at the UE, one or more power commands for at least one of the long uplink burst or the short uplink burst; and
   adjusting, by the UE, at least one of a value of a set point for the uplink power control for the long uplink burst or a value of a set point for the uplink power control for the short uplink burst, in response to receiving the one or more power commands.

21. The non-transitory computer readable medium of claim 15, wherein the code for transmitting the at least one of the long uplink burst and the short uplink burst further comprises code for sending the long uplink burst based on a regular service and the short uplink burst based on a low latency service.

22. A user equipment (UE) for wireless communications, comprising:
   means for receiving, at the UE, uplink power control information from a base station, wherein the uplink power control information includes one or more first power control parameters for a long uplink burst and one or more second power control parameters for a short uplink burst, and wherein the one or more first power control parameters are different from the one or more second power control parameters and the long uplink burst has a longer duration than the short uplink burst;
   means for configuring, by the UE, uplink power control for the long uplink burst based at least on the one or more first power control parameters and the short uplink burst based at least on the one or more second power control parameters; and
   means for sending, by the UE, at least one of a long uplink burst or a short uplink burst based on the corresponding uplink power control.

* * * * *